(12) United States Patent
Zotti

(10) Patent No.: US 12,703,603 B2
(45) Date of Patent: Aug. 11, 2026

(54) LIGHT MODULATION DEVICE OF AN ELEVATOR INSTALLATION AND LIGHT MODULATION TRANSMISSION METHOD

(71) Applicant: Inventio AG, Hergiswil (CH)

(72) Inventor: Teresa Zotti, Ebikon (CH)

(73) Assignee: INVENTIO AG, Hergiswil (CH)

( * ) Notice: Subject to any disclaimer, the term of this patent is extended or adjusted under 35 U.S.C. 154(b) by 947 days.

(21) Appl. No.: 17/997,567

(22) PCT Filed: May 3, 2021

(86) PCT No.: PCT/EP2021/061521
§ 371 (c)(1),
(2) Date: Oct. 31, 2022

(87) PCT Pub. No.: WO2021/224160
PCT Pub. Date: Nov. 11, 2021

(65) Prior Publication Data

US 2023/0183038 A1 Jun. 15, 2023

(30) Foreign Application Priority Data

May 8, 2020 (EP) .................................... 20173723

(51) Int. Cl.
*B66B 1/34* (2006.01)
*H04B 10/54* (2013.01)

(52) U.S. Cl.
CPC ........... *B66B 1/3461* (2013.01); *H04B 10/54* (2013.01)

(58) Field of Classification Search
CPC .......... B66B 1/3461; B66B 2201/4638; B66B 1/468; B66B 1/3446; H04B 10/54
See application file for complete search history.

(56) References Cited

FOREIGN PATENT DOCUMENTS

| | | | | |
|---|---|---|---|---|
| CN | 105347125 | A | | 2/2016 |
| JP | H0432471 | A | | 2/1992 |
| JP | 2006148798 | A | | 6/2006 |
| JP | 2007137650 | A | | 6/2007 |
| JP | 2009051617 | A | * | 3/2009 |
| JP | 2017226523 | A | * | 12/2017 |

OTHER PUBLICATIONS

Machine Translation of Takehiro's reference (JP-2017226523-A) (Year: 2017).*
Machine Translation of Hajime's reference (JP-2009051617-A) (Year: 2009).*
Fraunhofer IPMS, Li-Fi Use Cases, Internet website URL: https://www.ipms.fraunhofer.de/de/research-development/wireless-microsystems/LiFi/lifi-usecases.html, Mar. 17, 2020, Fraunhofer IPMS, Dresden, Germany.

* cited by examiner

*Primary Examiner* — Tarek Elarabi
(74) *Attorney, Agent, or Firm* — Shumaker, Loop & Kendrick, LLP

(57) ABSTRACT

A light modulation device is provided in an elevator installation having an elevator car for performing a method of modulating light in the elevator car. The light modulation device has a modulator that receives a first electrical signal from a control unit of the elevator installation, wherein the modulator, in order to modulate the first electrical signal, controls a lighting device in the elevator car having two or more light-emitting diodes. The lighting device generates a first light signal to encode the first electrical signal, and the modulator switches the light-emitting diodes on and off synchronously or asynchronously and/or adjusts their brightness.

8 Claims, 2 Drawing Sheets

LIGHT MODULATION DEVICE OF AN ELEVATOR INSTALLATION AND LIGHT MODULATION TRANSMISSION METHOD

FIELD

The present invention relates to a light modulation device of an elevator installation and to a method for modulating light in an elevator installation. Furthermore, the invention relates to an elevator installation which has such a light modulation device or is controlled by the method.

BACKGROUND

An elevator installation serves to transport people within a building by vertically displacing an elevator car in an elevator shaft between different stories (floors) of the building. It is difficult for wireless signals from an external wireless communications network (e.g., Internet or radio network, etc.) to penetrate walls of an elevator shaft because a metal coating or wire mesh in the walls could severely attenuate or block the signals. This is why there is usually no mobile phone reception in an elevator car or in an elevator shaft. In order to solve this problem, expensive antennas or a plurality of WLAN access points have to be arranged in the elevator car or in the elevator shaft.

The Internet of Things (IoT) refers to increasing networking of devices, sensors, etc. via an IP network. With the IoT, the field of application in industry and services is expanding to various sectors. The elevator sector could also benefit from an application of the IoT, i.e., connecting any device, including elevators, to the Internet and other connected devices. The current state of communication technology offers many possibilities for enabling data exchange between individual participants in a network. Nowadays, robots are becoming increasingly common among the participants because, in addition to conventional use in various production processes, new tasks for robots have also developed in other sectors, in particular in logistics or services such as gastronomy and in the form of domestic aids. The so-called "last mile" poses a major challenge in logistics, the "last mile" including the last distance covered, for example in e-commerce logistics, by a delivery of goods on site to the customer. The increasing number of packages can be distributed safely and quickly with as little effort as possible. Therefore, mobile transport robots are increasingly used. Currently, classic communication connections via the mobile Internet such as 3G, 4G and even 5G or WLAN are mainly used to connect robots to data communication. However, such data communications do not always meet criteria that require a high level of data protection for customer data. In addition, there are similar or the same problems as with mobile phones, that mobile robots in buildings cannot be reached at all times and consequently cannot be fully utilized, since robots are not able or are able only with difficulty to negotiate different floors by themselves using elevators and to move purposefully in buildings.

One problem addressed by the present invention can be seen as that of ensuring safe and reliable data communication between an elevator and mobile apparatuses, in particular robots, for operating the elevator or before or during the elevator journey.

Such a need can be met by the subject matter according to any of the advantageous embodiments defined in the following description.

SUMMARY

Possible features and advantages of embodiments of the invention can be considered, inter alia and without limiting the invention, to be based upon the concepts and findings described below.

According to a first aspect of the invention, a light modulation device of an elevator installation together with an elevator installation is proposed, the elevator car having a lighting device, the lighting device comprising two or more identical or different light-emitting diodes. The light modulation device has a modulator which can receive a first electrical signal from a control unit of the elevator installation. The control unit can be a main control or a subordinate sub-control of the elevator installation. In order to modulate the first electrical signal, the modulator can control the lighting device in such a way that the lighting device generates a first light signal in order to encode the first electrical signal. The modulator can switch the light-emitting diodes on and off and/or adjust their brightness, it being possible for the modulator to switch the light-emitting diodes synchronously or asynchronously and/or adjust their brightness. By means of such a light modulation device, an electrical signal can be converted into an optical signal and further transmitted.

According to a second aspect of the invention, a method for modulating light in an elevator installation is provided, the elevator installation having an elevator car which has a lighting device comprising two or more identical or different light-emitting diodes. In the method: a first electrical signal is generated by a control unit of the elevator installation; the lighting device, in order to modulate the first electrical signal, is controlled in such a way that a first light signal is generated by the lighting device in order to encode the first electrical signal, the light-emitting diodes being switched on and off and/or their brightness being adjusted, and the lighting device being modulated the light-emitting diodes by synchronously or asynchronously switching and/or adjusting the light-emitting diodes and/or their brightness.

According to a third aspect of the invention, an elevator installation is provided which has at least one light modulation device according to the first aspect of the invention or is monitored by a light modulation method according to the second aspect of the invention.

The light modulation can be achieved, for example, by LiFi technology (LiFi: Light Fidelity). LiFi, also known as free-space communication (VLC: Visible Light Communications), offers an alternative to conventional WLAN/WiFi (Wireless Fidelity), with WiFi using electromagnetic waves for data transmission, while LiFi uses light waves from light sources. Compared with other wireless communication standards, light modulation for data transmission provides several advantages, such as fast wireless data transmission with a data rate currently in the gigabit range, specifically at more than 10 gigabits per second (Gbit/s), which is many times faster than the previous cellular networks or WiFi. Light modulation is therefore suitable for the transmission of large data packets, e.g., video data in HD and 4K quality. Such data transmission has no interference because light rays are free of high-frequency waves and have no problem with EMC (electromagnetic compatibility), which means that electrical or electronic devices are not affected by data transmission. In addition, a light as a signal carrier offers a high level of data security for data transmission within an elevator car, because a shaft wall or the elevator car is automatically considered a reliable firewall for light waves, i.e., the data transmission cannot be detected from the outside.

According to an advantageous embodiment of the invention, the lighting device comprises two or more light-emitting diodes (LEDs), it being possible for the modulator to switch the light-emitting diode on and off and/or adjust its brightness in order to modulate the first electrical signal. The modulator can switch the LED on and off or change its brightness very quickly so that the human eye cannot see it. By switching the LED on and off or dimming it, the first electrical signal can be suitably converted into the first light signal. The brightness is adjusted only up to a particular limit value so that the intensity of the light does not decrease due to dimming to impair data transmission.

According to a further advantageous embodiment of the invention, the lighting device comprises a plurality of identical or different light-emitting diodes, it being possible for the modulator to switch the light-emitting diodes synchronously or asynchronously and/or adjust their brightness. In this case, a light signal can consist of one or more light rays or waves. Due to a higher number of LEDs, a significant increase in the capacity of wireless data transmission (bandwidth) can be made possible overall.

According to an advantageous embodiment of the invention, the control unit of the elevator installation can communicate with a local and/or a public communication network. The first electrical signal can be a data packet that corresponds to or is compatible with the network protocol of the particular communication network (e.g., LAN, WLAN, Internet, mobile radio or cloud, etc.). Therefore, the first electrical signal can either be generated by the elevator installation or transmitted via the communication network.

The light data transmission also works bidirectionally. According to the invention, the light modulation device can be communicated with a mobile terminal, it being possible for the first light signal to be received by the mobile terminal in order to decode the first electrical signal, and/or it being possible for the mobile terminal to generate a second light signal in order to encode a second electrical signal. The second electrical signal can also be in a different data form than that of the first electrical signal. The mobile terminal has, for example, a photodiode or a photoelectric sensor that picks up light and converts it into electrical signals. To generate the second light signal, the mobile terminal can, for example, use infrared LEDs in order to avoid signal interference or light interference.

According to a further advantageous embodiment of the invention, the light modulation device comprises a demodulator which can demodulate the second light signal in order to decode the second electrical signal, the decoded second electrical signal (e.g., in binary code) being forwarded to the control unit of the elevator installation. The second electrical signal can also be forwarded from the elevator installation via the communication network to other devices, such as an external server or a remote control center, it also being possible for the second electrical signal to be a data packet.

According to another advantageous embodiment of the invention, the mobile terminal is a robot that can operate the elevator installation by generating the second light signal and/or can navigate in a building in which the elevator installation is located by receiving the first light signal. The robot can then communicate with the elevator installation and navigate purposefully within the multi-story building. By being able to communicate with elevators, a robot can optimally shorten or cover its “last mile.” The robot can, for example, receive directions by receiving a first light signal and can control the elevator by transmitting a second light signal. Since the “last mile” is covered exclusively with the aid of imperceptible or invisible coded light signals, without a destination being entered at the elevator or having asked someone, customer data can be better protected.

It should be noted that some of the possible features and advantages of the invention are described herein with reference to different embodiments of the safety monitoring device and of a method for monitoring the working order thereof. A person skilled in the art will recognize that the features can be suitably combined, adapted or replaced in order to arrive at further embodiments of the invention.

Embodiments of the invention will be described below with reference to the attached drawings; neither the drawings nor the description should be interpreted as limiting the invention.

The drawings are merely schematic and not true to scale. Like reference signs denote like or equivalent features in the various drawings.

DETAILED DESCRIPTION

Figure 1:
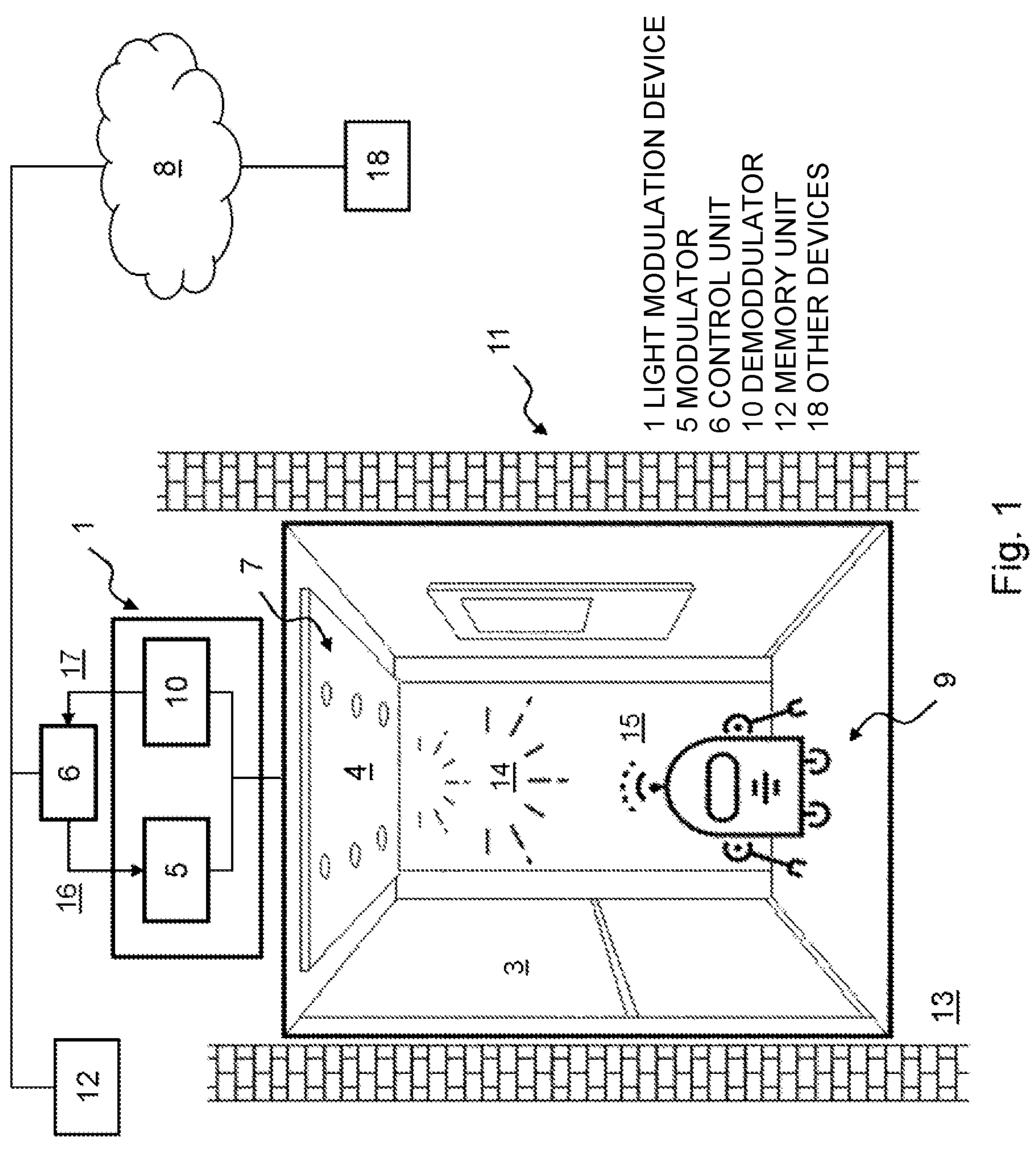
FIG. 1: shows an elevator installation comprising a light modulation device according to the invention and a mobile robot.

FIG. 1 shows an elevator installation 2 comprising an elevator car 3 that can move in a shaft 13 in a building 11 with several stories or floors (not shown), a lighting device 4 being provided in the elevator car 3. The lighting device 4 consists of a plurality of LEDs 7, which can form one or more LED strips. The elevator installation 2 also has a control unit 6 and a memory unit 12, the control unit 6 being connected to other devices such as servers, service platforms or remote control centers 18 via the Internet 8.

A light modulation device 1 is provided for the elevator installation 2. The light modulation device 1 comprises a modulator 5, which receives a first electrical signal 16, for example in the form of binary codes, from the control unit 6. The first binary code 16 either can be generated by the control unit 6 itself or can be obtained from the memory unit 12 of the elevator installation 2 or from a server 18 via the Internet 8. The modulator 5 then controls the LEDs 7 of the lighting device 4 in such a way as to modulate the first binary code 16 by the modulator 5 switching the LEDs 7 on and off individually—synchronously or asynchronously. The LEDs 7 then light up accordingly and emit a first light signal 14 according to the first code 16, the light signal having a plurality of light rays. A lit LED represents a binary code “1,” while a non-lit LED represents a binary code “0.”

Modulation can also be carried out by dimming the LEDs 7, it being possible for different, specific brightnesses of lit LEDs 7 to each represent a digital “1” or “0.” The first code 16 can then be encrypted with light signals by slight changes in the brightness of LEDs. The first code 16 can thus be modulated by the light modulation device 1 and suitably converted into the first light signal 14 by means of the lighting device 4.

Furthermore, data can be transmitted between the light modulation device 1 and a mobile robot 9 if the robot 9 is equipped with a photoelectric sensor or a digital video camera (not shown). The robot is preferably a mobile vehicle that moves autonomously and communicates with the environment via sensors and interfaces. The photoelectric sensor of the robot 9 can receive the generated first light signal 14 and convert it back into the first code 16. The data transmission can also be bidirectional communication, i.e., a second light signal 15, which is generated by the robot 9 and encodes a second code 17, is also detected and demodulated by a demodulator 10 of the light modulation device 1, as a result of which the second code 17 is decoded again from the second light signal 15. Thereafter, the second code 17 is forwarded to the control unit 6 of the elevator installation, it also being possible for the second code 17 to be a binary code or in another data form. The second code 17 is also stored in the memory unit 12 or forwarded to the server or a remote control center 18 via the Internet 8 if required.

Figure 2:
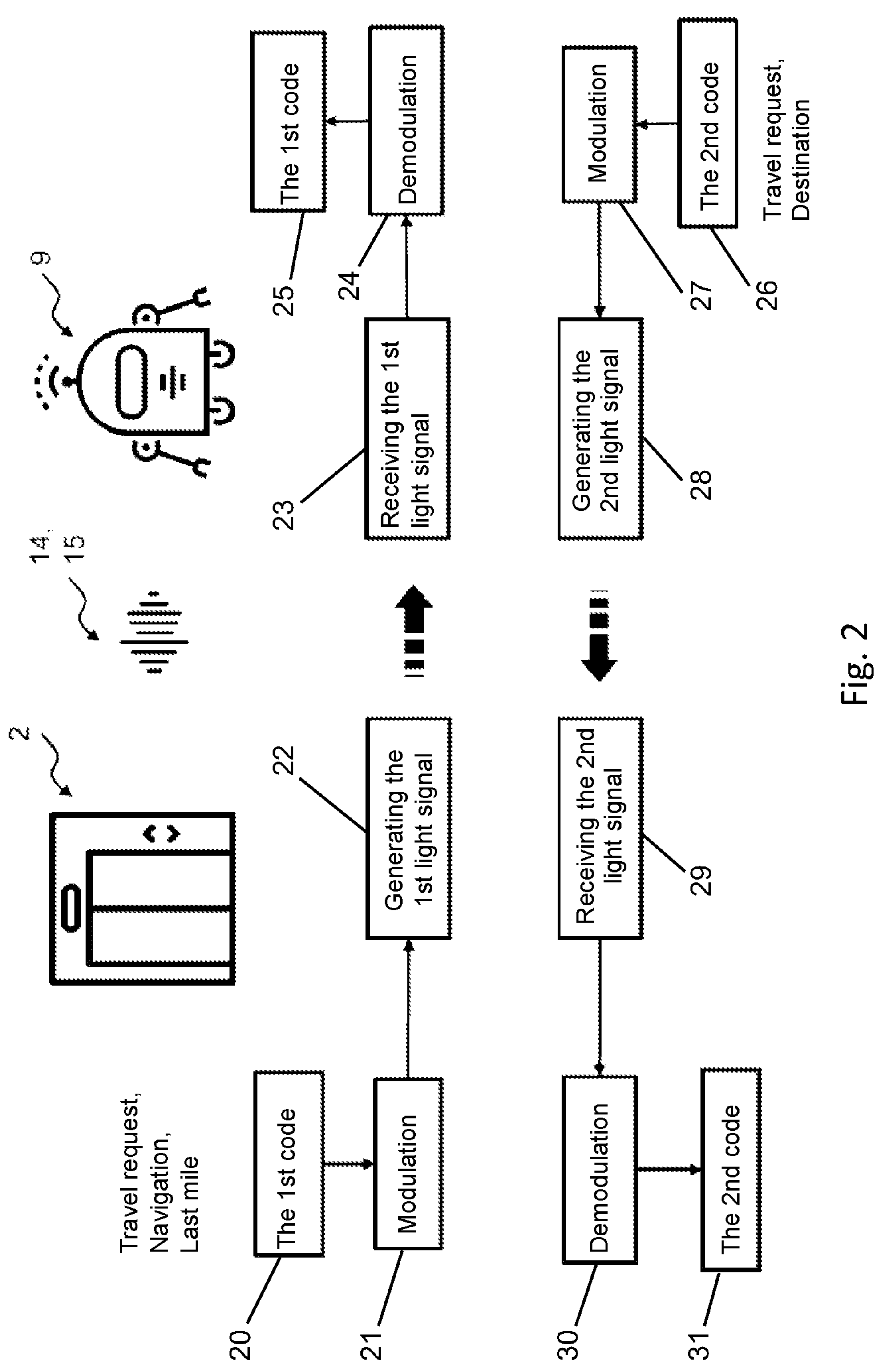
FIG. 2: shows a method for communication between an elevator installation and a mobile robot.

FIG. 2 shows a communication method that takes place between an elevator installation 2 and a robot 9. If an elevator car 3 of the elevator installation 2 stops on a floor, the control unit 6 in a step 20 generates a first binary code 16 which contains information about readiness or a travel request, for example. After a modulation in a step 21, a first light signal 14 is generated in a step 22 by a lighting device 4 in the elevator car 3 according to the first code 16. When the robot 9 enters the elevator car 3, it receives the first light signal 14 in a step 23. The robot 9 retrieves the first code 16 by demodulation in the robot itself in a step 24, as a result of which the robot 9 learns the travel request in a step 25. In response to the travel request, the robot 9 generates a second code 17 in a step 26 and modulates this in a step 27 into a second light signal 15 in a step 28, the second code containing information about a destination input, for example. In contrast to the first light signal 14, the second light signal 15 can optionally be generated by infrared LEDs, as a result of which the light is not visible. After the second light signal 15 has been received in a step 29 and demodulated in a step 30 in the elevator installation 2, the elevator installation 2 can receive the second code 17 in a step 31 or the information contained therein. In response to the second code 17, the elevator installation can in turn generate a further first code 16. This code can, for example, contain information for a so-called "last mile," which information includes, for example, navigation data, a precise room number and/or a special instruction for the robot 9.

Since the communication between the elevator installation 2 and the mobile robot 9 requires only imperceptible or invisible light waves as a data transmitter, such communication is more reliable, interference-free and safer than radio technologies such as WiFi. This means that the exchange of customer data can be better protected over the last mile. In this way, the robot 9 can communicate with the elevator installation 2 in a reliable and customer-friendly manner, so that it can operate the elevator installation 2 and move quickly in the building 11. For example, a room map and position data for precise indoor navigation inside the building 11 could be transmitted to the robot 9.

Of course, the robot 9 can first generate a second code 17, which contains, for example, a travel request or a destination call, without waiting for a first light signal. Analogously to the method explained above, the second code 17 is converted into a second light signal 15, which is picked up and demodulated by the elevator installation 2 so that the second code 17 can be transmitted to the elevator installation 2 and retrieved.

Finally, it should be noted that terms such as "comprising," "having," etc., do not preclude other elements or steps and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A light modulation device of an elevator installation, the elevator installation having an elevator car with a lighting device inside the elevator car, the light modulation device comprising:

a modulator receiving a first electrical signal from a control unit of the elevator installation;

wherein the lighting device has at least two light-emitting diodes;

wherein the modulator modulates the first electrical signal by controlling the lighting device to generate a first light signal representing the first electrical signal encoded, the modulator modulating by synchronously or asynchronously switching the at least two light-emitting diodes on and off and/or by adjusting a brightness of each of the at least two light-emitting diodes;

wherein the light modulation device communicates with a mobile terminal for at least one of the mobile terminals receiving the first light signal and decoding the first electrical signal from the first light signal and the mobile terminal generating a second light signal encoding a second electrical signal; and wherein the mobile terminal is a robot that operates the elevator installation by generating the second light signal, and navigates in a building in which the elevator installation is located by receiving and responding to the first light signal.

2. The light modulation device according to claim 1 wherein the control unit of the elevator installation is connected to a local and/or a public communication network.

3. The light modulation device according to claim 1 wherein the light modulation device includes a demodulator that demodulates the second light signal to decode the second electrical signal and forwards the decoded second electrical signal to the control unit of the elevator installation.

4. An elevator installation comprising:

the elevator car;

the lighting device inside the elevator car;

the control unit; and the light modulation device according to claim 1 connected to the lighting device and the control unit and controlling the lighting device.

5. A method for modulating light in an elevator installation having an elevator car with a lighting device including at least two light-emitting diodes, the method comprising the steps of:

generating a first electrical signal by a control unit of the elevator installation;

controlling the lighting device to generate a first light signal by modulating the first electrical signal to encode the first electrical signal in the first light signal;

performing the modulating by at least one of synchronously or asynchronously switching the at least two light-emitting diodes on and off and adjusting a brightness of each of the at least two light-emitting diodes;

receiving the first light signal with a mobile terminal and decoding the first electrical signal from the first light signal using the mobile terminal; and generating a second light signal from the mobile terminal with a second electrical signal encoded in the second light signal, wherein the mobile terminal is a robot that operates the elevator installation by generating the second light signal, and navigates in a building in which the elevator installation is located by receiving and responding to the first light signal.

6. The light modulation method according to claim 5 wherein the control unit is connected to a local and/or a public communication network.

7. The light modulation method according to claim 5 including demodulating the second light signal to decode the second electrical signal, and forwarding the decoded second electrical signal to the control unit of the elevator installation.

8. An elevator installation comprising:

the elevator car;

the lighting device inside the elevator car and having at least two light-emitting diodes;

the control unit; and a light modulation device connected to the lighting device and the control unit, wherein the light modulation device is controlled by the light modulation method according to claim 5.

* * * * *